March 3, 1931. J. B. BURNS 1,795,247
HIGHWAY SAFETY GUARD
Filed Aug. 13, 1930   3 Sheets-Sheet 1
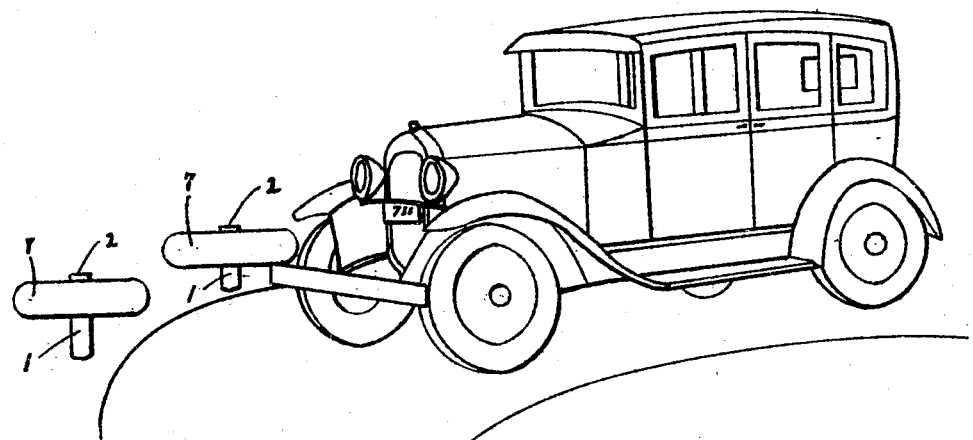
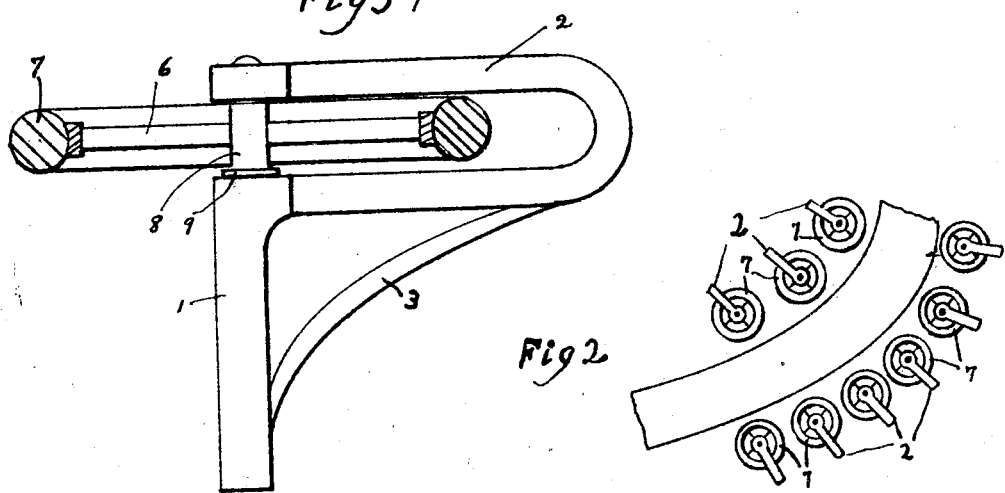
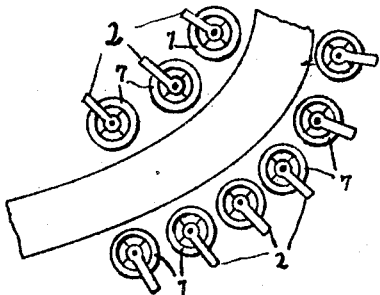
Inventor
John Brevoort Burns
By *Clarence A. O'Brien*
Attorney March 3, 1931. J. B. BURNS 1,795,247
HIGHWAY SAFETY GUARD
Filed Aug. 13, 1930 3 Sheets-Sheet 2
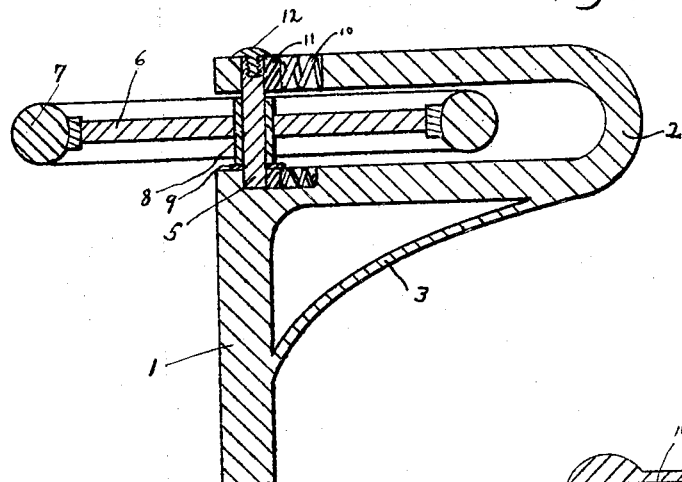
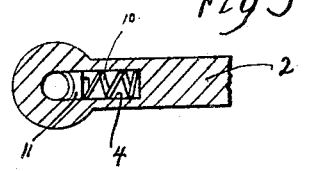
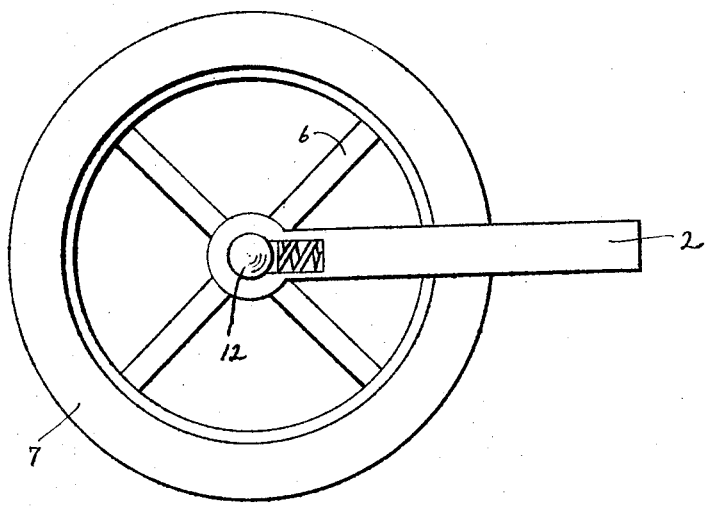
Inventor
John Brevoort Burns
By Clarence A. O'Brien
Attorney March 3, 1931.   J. B. BURNS   1,795,247
HIGHWAY SAFETY GUARD
Filed Aug. 13, 1930   3 Sheets-Sheet 3
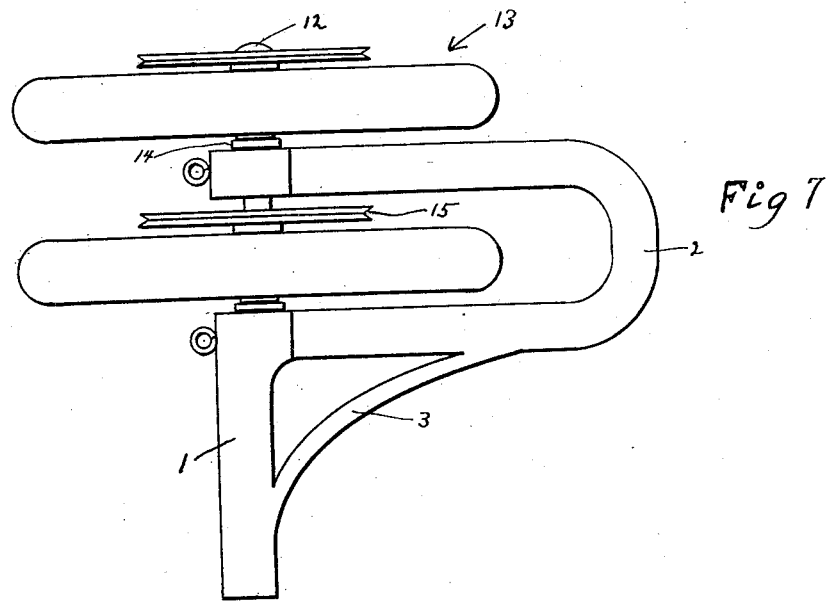
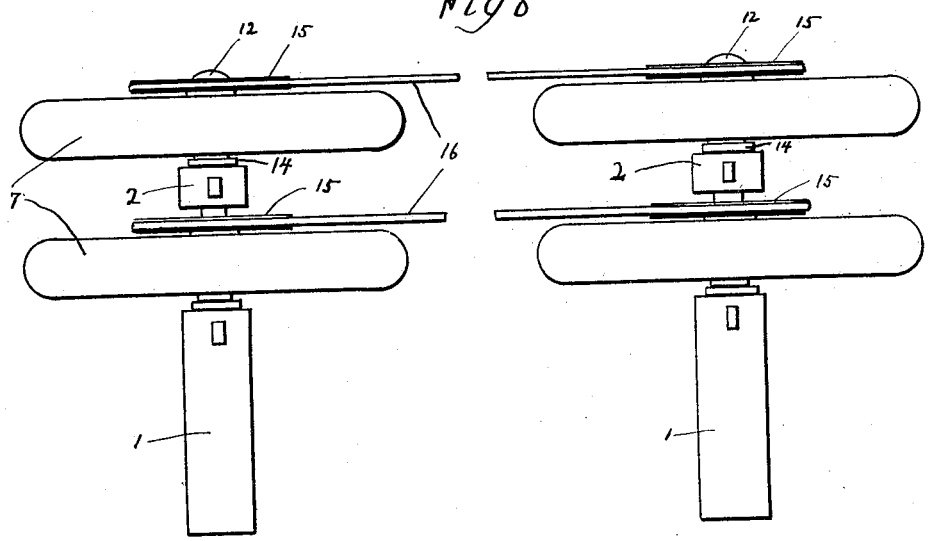
Inventor
John Brevoort Burns
By *Clarence A. O'Brien*
Attorney Patented Mar. 3, 1931

1,795,247

UNITED STATES PATENT OFFICE

JOHN B. BURNS, OF ONEONTA, NEW YORK

HIGHWAY SAFETY GUARD

Application filed August 13, 1930. Serial No. 475,047.

This invention relates to a highway safety guard, and has for its primary object to provide, in a manner as herein set forth, a device of this character, which is adapted to be set up on one or both sides of a highway, at dangerous points of said highway, such as at curves and along dangerous embankments or ditches to prevent a vehicle from leaving the highway.

Another important object of the invention is to provide a highway safety guard of the character described, embodying rotary means disposed for engagement with a vehicle which may collide therewith, said rotary means adapted to prevent the vehicle from leaving the highway with minimum damage to the vehicle and in a manner to materially reduce the likelihood of injury to the occupants of the vehicle.

Other objects of the invention are to provide a highway safety guard, which will be simple in construction, strong, durable, efficient in use, and which may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:

Figure 1 is a perspective view, showing a curved portion of a highway, with a guard in accordance with this invention positioned thereon.

Figure 2 is a view in top plan, showing the arrangement of the guard on opposite sides of a curved portion of a highway.

Figure 3 is a view of one of the units showing the supporting bracket in side elevation and the rotary wheel thereon in section.

Figure 4 is a vertical longitudinal sectional view, through one of the units.

Figure 5 is a fragmentary view in horizontal section, showing the means for yieldably mounting the axles of the wheels for lateral sliding movement in the supporting structures of the units.

Figure 6 is a view in top plan of one of the units.

Figure 7 is a view in side elevation of a slightly modified form of the invention.

Figure 8 is a view in front elevation of the form of the invention illustrated in Figure 7.

Referring to the drawings in detail, it will be seen that the reference numeral 1 designates a post having formed integrally on its upper ends and extending at right angles thereto the right angularly disposed yoke 2. A brace 3 extends between the posts 1 and the yoke 2. The post 1, yoke 2, and the brace 3 are formed of any suitable material, preferably metal and are also preferably cast in one piece.

The free end portions of the arms of the yoke 2 have formed therein the vertically aligned slots 4, for the passage of the axle 5, upon which the wheel 6 is mounted for rotation in a horizontal plane. A suitable annular cushioning member 7, preferably of rubber, is mounted on the periphery of the wheel 6. A hub portion 8 of the wheel 6 rests on a removable flange 9, which is slidably disposed on the inner side of the lower arm of the yoke 2, and constitutes a thrust bearing for supporting the hub 8. A coil spring 10 is disposed in each of the slots 4, and slidable blocks 11 are disposed between the axle 5 and the adjacent ends of the coil spring. The upper end of the axle 5 has formed therein a threaded socket, into which the threaded removable head 12 is inserted. The head 12 bridges the slot 4 in the upper arm of the yoke 2 and is adapted for slidable rest on the yoke.

Should it be so desired, the head 12 may be removed and an axle extension threaded into the upper end of the axle 5 for rotatably supporting another wheel on the unit in superposed relation to the wheel 6, in the manner illustrated in Figures 7 and 8 of the drawings. In said Figures 7 and 8, the superposed wheels are designated generally by the reference numerals 13 and are identical in construction to the wheel 6. The superposed axles which are threaded into the axles 5 are provided with a flange 14, for slidable rest on the upper arm of the yokes 2 of the units. The heads 12 in the form of the invention illustrated in Figures 7 and 8 are threaded into the upper axles.

In the form of the invention seen in Figures 7 and 8, a grooved pulley 15 is fixed on the upper and lower axles of each unit above the wheels 13 and 6. The units are disposed along one or both sides of a highway, in the manner clearly illustrated in Figures 1 and 2 of the drawings. When disposed along the curved portions of the highway, the units are disposed comparatively close together, to prevent a vehicle which may collide therewith from engaging the intermediate units outwardly of the centers.

Thus, when a vehicle leaves the highway, said vehicle will pass from one of the units to the next, the wheels of said units rotating when engaged by the vehicle.

When the units are disposed along a substantially straight portion of the highway, said units are disposed comparatively far apart, and when this is the case, the endless belts or cables 16 extend between the units and are trained over the grooved pulleys 15, thus a vehicle which engages the cables or belts 16 will travel along said cables or belts, until the wheels or wheel of the first unit are engaged and the vehicle will be directed back toward the highway.

It is understood, of course, that the unit when mounted on either a curved or straight portion of a highway, may have any desired number of the horizontally disposed rotary wheels mounted thereon, and it is also understood that the pulleys 15 and the cables or belts 16 may be eliminated on a substantially straight portion of the highway and the units placed close together as on a curve, if desired. The resilient mounting of the axles 5 in the supporting structures for the wheels absorb a substantial portion of the shock of the impact of the vehicle with said wheels, as will be readily apparent.

The posts 1 may be of any desired length, and anchored in the ground, if desired, in any suitable manner, such as by embedding same in concrete.

It will further be understood that the posts 1 may be formed comparatively short and provided with means whereby the same may be mounted on the post of highway guard fences which are already erected. The gist of this invention resides in the provision of rotary means mounted along a highway for engagement by a vehicle leaving said highway, in a manner to prevent the vehicle from leaving the highway.

It is believed that the many advantages of a highway safety guard constructed in accordance with this invention will be readily understood, and although the preferred embodiment of the invention is as illustrated and desired, it is to be understood that changes in the details of construction may be had, which will fall within the scope of the invention as claimed.

What is claimed is:

1. In a highway safety guard of the character described, a vertical post adapted to be mounted adjacent the highway, a horizontally disposed yoke mounted on the upper end of the post and extending laterally therefrom, and a wheel mounted for rotation in a horizontal plane in the open end portion of the yoke.

2. In a highway safety guard of the character described, a vertical supporting post, a horizontally disposed yoke mounted on the upper end of the supporting post, and extending laterally therefrom, longitudinally disposed slots in the arms of the yoke, an axle mounted for sliding movement in the slots, and a wheel mounted for rotation in a horizontal plane on the axle and adapted for horizontal movement in the yoke.

3. In a highway safety guard of the character described, a vertical supporting post, a horizontally disposed yoke mounted on the upper end of the post and extending laterally therefrom, said yoke having the arm portions provided with longitudinally extending slots, a vertical axle mounted for lateral sliding movement in the slots, coil springs mounted in the slots for yieldingly urging the axle toward one end of said slots, a wheel mounted for rotation in a horizontal plane on the axle and adapted for shifting movement in a horizontal plane in the yoke.

4. In a highway safety guard of the character described, a vertical supporting post, a horizontally disposed yoke mounted on the upper end of the post and extending laterally therefrom, said yoke having the arm portions provided with longitudinally extending slots, a vertical axle mounted for lateral sliding movement in the slots, coil springs mounted in the slots for yieldingly urging the axle toward one end of said slots, a wheel mounted for rotation in a horizontal plane on the axle and adapted for shifting movement in a horizontal plane in the yoke, blocks slidably mounted in the slots and interposed between the springs and the end portions of the axle, and a brace extending between the post and the yoke.

5. In a highway safety guard of the character described, a vertical supporting post, a horizontally disposed yoke mounted on the upper end of the post and extending laterally therefrom, said yoke having the arm portions provided with longitudinally extending slots, a vertical axle mounted for lateral sliding movement in the slots, coil springs mounted in the slots for yieldingly urging the axle toward one end of said slots, a wheel mounted for rotation in a horizontal plane on the axle and adapted for shifting movement in a horizontal plane in the yoke, blocks slidably mounted in the slots and interposed between the springs and the end portions of the axle, a brace extending between the post and the yoke, resilient cushioning means mounted on the periphery of the wheel, and a thrust receiving flange interposed between the hub portion of the wheel and the yoke.

6. A highway guard structure of the character described comprising a series of supporting structures, a plurality of superposed wheels mounted for rotation in a horizontal plane on each of the supporting structures, pulleys fixed to each of the wheels, and endless cables trained over the pulleys on the wheels of the adjacent supporting structures.

7. A highway guard comprising a series of independently mounted, horizontal wheels, a vertical supporting post for each wheel, and a horizontal disposed yoke on the upper portion of each post, said wheels being journaled for rotation in the yokes.

In testimony whereof I affix my signature.

JOHN B. BURNS.